United States Patent
Levine et al.

(10) Patent No.: US 11,090,870 B2
(45) Date of Patent: *Aug. 17, 2021

(54) EXTRACTING AN EMBEDDED DATABASE FROM A PHYSICAL OBJECT

(71) Applicant: Xerox Corporation, Norwalk, CT (US)

(72) Inventors: Jonathan D. Levine, Rochester, NY (US); Donald M. Pangrazio, III, LerRoy, NY (US); David R. Vandervort, Walworth, NY (US); Reiner Eschbach, Webster, NY (US); Robert Eero Nuuja, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/229,394

(22) Filed: Dec. 21, 2018

(65) Prior Publication Data

US 2019/0126556 A1 May 2, 2019

Related U.S. Application Data

(63) Continuation of application No. 14/635,495, filed on Mar. 2, 2015, now Pat. No. 10,201,938.

(51) Int. Cl.
*B29C 67/00* (2017.01)
*B29C 64/386* (2017.01)
(Continued)

(52) U.S. Cl.
CPC ............ *B29C 64/386* (2017.08); *G05B 15/02* (2013.01); *G05B 19/4099* (2013.01);
(Continued)

(58) Field of Classification Search
CPC ... B29C 67/0088; B29C 64/386; G05B 15/02; G05B 19/4099; G05B 19/4183; B33Y 50/02
See application file for complete search history.

(56) References Cited

U.S. PATENT DOCUMENTS

| 5,387,380 | A | 2/1995 | Cima et al. |
| 7,806,339 | B2 | 10/2010 | Ferren et al. |

(Continued)

FOREIGN PATENT DOCUMENTS

WO 2007079549 A1 7/2007

OTHER PUBLICATIONS

Kumar, P. Mohan et al., "A multilayered architecture for hiding executable files in 3D images", Indian Journal of Science and Technology, vol. 3, No. 4 (Apr. 2010), ISSN: 0974-6846.

*Primary Examiner* — Mohammad Ali
*Assistant Examiner* — Vincent W Chang
(74) *Attorney, Agent, or Firm* — Fox Rothschild LLP

(57) ABSTRACT

A method of extracting data embedded in a 3D object includes a 3D scanning device scanning a 3D object and extracting data embedded as physical representations in the 3D object. A processing device will identify, from the extracted data, instructions for causing the processing device to perform an action such as identifying building instructions for printing a copy of the 3D object. The processing device will also perform the action to identify the building instructions, and cause a 3D printer to use the building instructions to print the copy of the 3D object. The processing device may be part of the 3D scanning device or part of another device or system that is in communication with the 3D scanning device.

15 Claims, 5 Drawing Sheets

(51) Int. Cl.
*G05B 15/02* (2006.01)
*G05B 19/4099* (2006.01)
*G05B 19/418* (2006.01)
*B33Y 50/02* (2015.01)

(52) U.S. Cl.
CPC .......... *G05B 19/4183* (2013.01); *B33Y 50/02* (2014.12); *G05B 2219/32049* (2013.01); *G05B 2219/37558* (2013.01); *G05B 2219/45186* (2013.01); *G05B 2219/49009* (2013.01); *G05B 2219/49013* (2013.01)

(56) References Cited

U.S. PATENT DOCUMENTS

| | | |
|---|---|---|
| 8,070,473 B2 | 12/2011 | Kozlak |
| 8,091,042 B2 | 1/2012 | Chen et al. |
| 8,750,598 B2 | 6/2014 | Bonner et al. |
| 9,566,743 B2 | 2/2017 | Kozlak et al. |
| 9,595,037 B2 | 3/2017 | Glasgow et al. |
| 2005/0010776 A1 | 1/2005 | Kenen et al. |
| 2005/0206500 A1 | 9/2005 | Ferren et al. |
| 2006/0133877 A1 | 6/2006 | Lynggaard |
| 2012/0305003 A1 | 12/2012 | Mark |
| 2013/0015596 A1 | 1/2013 | Mozeika et al. |
| 2013/0305380 A1 | 11/2013 | Diehl et al. |
| 2014/0222859 A1 | 8/2014 | Rathod |
| 2015/0235069 A1 | 8/2015 | Kumar et al. |
| 2015/0242564 A1 | 8/2015 | Chang et al. |
| 2017/0312980 A1 | 11/2017 | Tanaka et al. |

EXTRACTING AN EMBEDDED DATABASE FROM A PHYSICAL OBJECT

CROSS REFERENCE TO RELATED APPLICATIONS

This application claims priority to, and is a continuation of U.S. patent application Ser. No. 14/635,495, filed Mar. 2, 2015, the disclosure of which is incorporated herein by reference in its entirety.

BACKGROUND

Typically, information about man-made, physical artifacts and/or objects is stored as data external to the object itself. Exceptions may include the object's chemical composition, or an identifying mark such as a signature. In some cases, its intended purpose may also be inferred from its shape. However, modern businesses often need to know much more about an object without referring to external data sets. This is particularly useful in three-dimensional (3D) printing, where a manufacturing device and/or a user may want to access the object's manufacturing information from the object itself, so as to enable quick and automated 3D printing.

To resolve this, businesses set up entire infrastructures to hold metadata (information about the classes of objects and individual objects themselves), or any other data needed or desired by the object's designer. This infrastructure is typically connected to an object via data matrix codes such as QR codes, bar codes, or radio frequency identification (RFID) tags that are positioned inside or on the object. However, these types of codes contain only a limited amount of information, and the user still needs to access external data sets to retrieve the complete information about an object. For example, even the highest density QR codes may only hold several thousand alphanumeric characters, and may only point to an external database address or link. Furthermore, such codes may be obtrusive in nature and are clearly visible.

Another drawback is that the infrastructures required to hold huge amounts of metadata are expensive, and so businesses may only save the metadata for a limited time. Once the time limit for storing the metadata for an object expires, it may become extremely difficult to get any information about an object.

The current disclosure discloses systems and methods to embed large volumes of data in a 3D object such that the object itself may function as a database. The current disclosure discloses systems and methods to extract data that has been embedded in a 3D object where the object itself is functioning.

SUMMARY

In an embodiment, a method of extracting a data embedded in a 3D object uses a 3D scanning device to scan a 3D object and extract data embedded as physical representations in the 3D object. A processing device will identify, from the extracted data, instructions for causing the processing device to perform an additional action that uses the data. Such actions may include causing a display device to display at least a portion of the data, causing a transmitter to transmit at least a portion of the data to an external database, causing a transmitter to transmit at least a portion of the data to an external application, or causing a user interface to solicit and receive user input for handling the data. The processing device may be part of the 3D scanning device, or the processing device may be part of another device or system that is in communication with the 3D scanning device. The method includes performing the action and returning a result of the action to a user of an electronic device. It may also include receiving a user selection of the portion of the data.

Optionally, the instructions for performing the action may include instructions to identify, from the extracted data, instructions for building the 3D object. When transmitting at least a portion of the data to an external application, the system may transmit the building instructions to a 3D printer. If so, the method may further include building, by the 3D printer, a copy of the 3D object.

Optionally, the instructions for performing the action may include instructions to identify, from the extracted data, a web address. When transmitting at least a portion of the data to an external application, the method may transmit the web address to the external application, and it may use the external application to access a set of build instructions at the web address. The method also may include causing the build instructions to be transmitted to a 3D printer. The 3D printer may implement the build instructions to construct a copy of the 3D object.

Optionally, the plurality of physical representations may include cavities or raised areas, and a size of each cavity or raised area may represent a value of a data point within a data structure. If so, then scanning the 3D object and extracting the data embedded in the 3D object may include using a sensor to detect a location and size of each cavity or raised area; determining a value for each cavity or raised area based on its location, size or both; and including each value in the data.

Alternatively, the physical representations may comprise metal particles. If so, scanning the 3D object and extracting the data embedded in the 3D object may include using an x-ray, magnetic sensor, or other sensor to detect a configuration of the metal particles, determine a value based on the detected configuration, and include each value in the data.

In an alternate embodiment, a system for extracting data embedded in a 3D object includes a 3D scanning device having a processor and computer-readable memory portion containing programming instructions that, when executed, cause a sensor of the scanning device to scan a 3D object and extracting data embedded as physical representations in the 3D object. The system also may include a computer-readable memory portion containing programming instructions that, when executed by a processing device, cause the processing device to: (i) identify, from the extracted data, instructions for performing an action. The action may include, for example, causing a display device to output at least a portion of the data, causing a transmitter to transmit at least a portion of the data to an external database, causing a transmitter to transmit at least a portion of the data to an external application, or causing a user interface to solicit and receiving user input for handling the data. The system may also perform the action that uses the data and return a result of the action to a user of an electronic device.

Optionally, the system also includes a 3D printer. If so, the instructions for performing the action may include instructions configured to cause the 3D printer build the 3D object. The instructions to transmit at least a portion of the data to an external application may include instructions to transmit the building instructions to the 3D printer. The 3D printer comprises programming that, when applied to the building instructions, causes the 3D printer to construct a copy of the 3D object.

Alternatively, if the system also includes a 3D printer, the instructions for performing the action may include instructions to identify, from the extracted data, a web address. The instructions to transmit at least a portion of the data to an external application may include instructions to transmit the web address to the external application and use the external application to access a set of build instructions at the web address. In addition, the system may also include instructions to cause the build instructions to be transmitted to the 3D printer and, by the 3D printer, implement the build instructions to construct a copy of the 3D object.

In some embodiments, the physical representations comprise cavities or raised areas, and a size of each cavity or raised area represents a value of a data point within a data structure. If so, the sensor may include an imaging device. The instructions to scan the 3D object and extract the data embedded in the 3D object may include instructions to analyze data collected by the imaging device to detect a location and size of each cavity or raised area, determine a value for each cavity or raised area based on its location, size or both, and include each value in the data.

In other embodiments, the physical representations comprise metal particles, the sensor comprises an x-ray or magnetic sensor, and the instructions to scan the 3D object and extract the data embedded in the 3D object comprise instructions to: (i) use the sensor to detect a configuration of the metal particles; (ii) determine a value based on the detected configuration; and (iii) include each determined value in the data.

In another embodiment, a method of extracting a data structure embedded in a 3D object uses a 3D scanning device to scan a 3D object and extract data embedded in the 3D object. A processing device receives structural parameters for a 3D object, wherein the parameters comprise a plurality of structural parameters. The system uses the structural parameters to develop an instruction set that, when executed by a processor of a 3D printing device, will cause the device to form a 3D object that exhibits the structural parameters by depositing a build material in a layers and curing the build material. The instruction set may be saved to a data file, and the system may identify an address for a location of the data file when saved. If so, then the 3D printing device may execute the instruction set and, based on the instruction set, form the 3D object with the address formed on at least one surface of the object.

DETAILED DESCRIPTION

Figure 1:
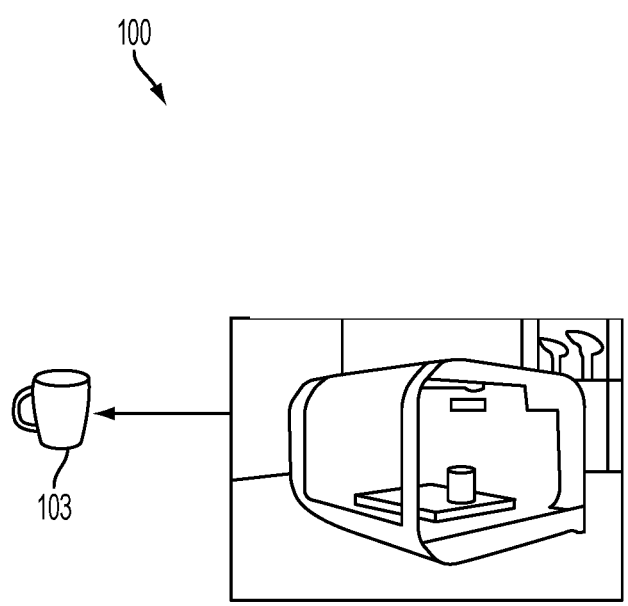
FIG. 1 illustrates a schematic representation of a system for embedding information in a three dimensional object, according to an embodiment.

For purposes of this document, the following terms shall have the following meanings:

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "computing device" or "electronic device" refers to a device that includes a processor and non-transitory, computer-readable memory. The memory may contain programming instructions that, when executed by the processor, cause the computing device or electronic device to perform one or more operations according to the programming instructions. As used in this description, a "computing device" or an "electronic device" may be a single device, or any number of devices having one or more processors that communicate with each other and share data and/or instructions. Unless the context specifically dictates otherwise, the term "processor" or "processing device" will include embodiments having a single processor, as well as embodiments in which multiple processors collectively perform various steps of a process. Examples of computing devices and/or electronic devices include personal computers, servers, mainframes, printing devices having a processor and a memory, gaming systems, televisions, and portable electronic devices such as smartphones, personal digital assistants, cameras, tablet computers, laptop computers, media players and the like.

The terms "three dimensional printing" and "3D printing" refer to one of various processes of forming a three-dimensional object from a model or other electronic data source through a process by which multiple layers of a build material are formed and cured, typically under control of a computing device. Examples of 3D printing processes include, without limitation, stereolithography, selective laser sintering, fused deposition modeling, and laminated object manufacturing.

The terms "three dimensional printing device" and "3D print device" refer to a device or system that is capable of performing a 3D printing process. A 3D print device will include a processor. The processor will implement programming instructions, typically using parameters from a data file, that cause an applicator of the device to selectively deposit layers of a build material (such as a photopolymer or powder), and that cause a radiation generating device (such as a laser or heat source) to selectively apply energy to help cure the deposited layers of build material. As used throughout this disclosure, the terms "three-dimensional printing system," "three-dimensional printer," "3D print device," "3D printing system," and "3D printer" refer to any now or hereafter known 3D printing system or printer.

The terms "three dimensional scanning device" and "3D scanner" refer to a device or system that is capable of performing scanning data that is embedded in a physical object. A 3D print device will include a processor and one or more sensors that can sense physical attributes of the objects. The sensors may include, for example, an image sensor (camera), sonic sensor (e.g., sonar), materials or chemical properties sensor, a magnetic sensor, an x-ray device, a combination of an infrared camera with an infrared light source, or other sensors. The processor will implement programming instructions, typically using parameters from a data file, that cause the sensor to collect data that is embedded in a 3D object. As used throughout this disclosure, the terms "three-dimensional printing system," "three-dimensional scanner," "3D scanning device," "3D scanning system," and "3D scanner" refer to any now or hereafter known 3D printing system or printer.

"Designing" an object means performing any action or combination of actions which modifies or creates a file comprising data that models or is used to build an object. Designing may be performed on an object which has been previously created as well as for creating a new object from scratch.

The terms "database," "data set," and "data structures" refer to a structured set of data that is accessible by an electronic device, and may be used interchangeably in the current disclosure. The electronic device may search the database and selectively retrieve data that satisfies applicable search parameters.

It should be appreciated that a 3D object (manufactured using a 3D printer) may be any type of object imaginable, and that the embodiments disclosed herein should not be understood to apply to only certain types or classes of 3D objects.

"Structural parameters" define the structure of a 3D object, and may include the shape, size, surface geometry, interior geometry, physical representations of databases and other such information.

FIG. 1 shows a schematic representation of a system embodiment for manufacturing a desired 3D object(s) 103 using a 3D print device 102. The 3D print device 102 may be in communication with a computing device 101 having a memory device for storing computer-aided design (hereinafter "CAD") software capable of designing and creating objects for 3D printing. In some embodiments, the computing device 101 may be integral with the 3D print device 103. Alternatively, the computing device 101 and 3D print device 101 may be separate devices that share data files by one or more communication networks, or by a physical or manual file transfer process. Typically, CAD files contain specifications, from which geometry of an object is generated, which in turn allow for a representation of the object to be generated. Geometry and representation may be stored in a single CAD file or multiple ones. The CAD software module includes graphic tools for representing the modeled objects to the designers. These tools are dedicated to the display of complex objects. A CAD system manages models of objects, which are stored in electronic files. The methods disclosed herein can also be implemented as stand-alone software not dependent on pre-existing CAD software or CAD framework. Such a program may implement its own GUI, and may use standard 3D software libraries for 3D model generation. Alternatively, such a program may implement its own libraries for generating 3D models. The use of CAD software in this disclosure is by way of example, and a person skilled in the art will understand that other software and/or design tools may be used without diverting from the principles of the disclosure.

The computing device may also include one or more add-on enhancement modules for enhancing the functionalities of the original CAD software such that it may allow a user to embed information in a 3D object in accordance with the principles disclosed here. The add-on enhancement module(s) may be a software application including functionality to allow a user to create data and database schema from information, and embed the data and database schema in the object 103. In some embodiments, the add-on enhancement module may be stored in a memory device of the computing device 101. Alternatively, the add-on enhancement module may be provided on a separate device (such as a memory stick) or as a cloud-based software application that may share data files with the CAD software by one or more communication networks, or by a physical or manual file transfer process.

Figure 2:
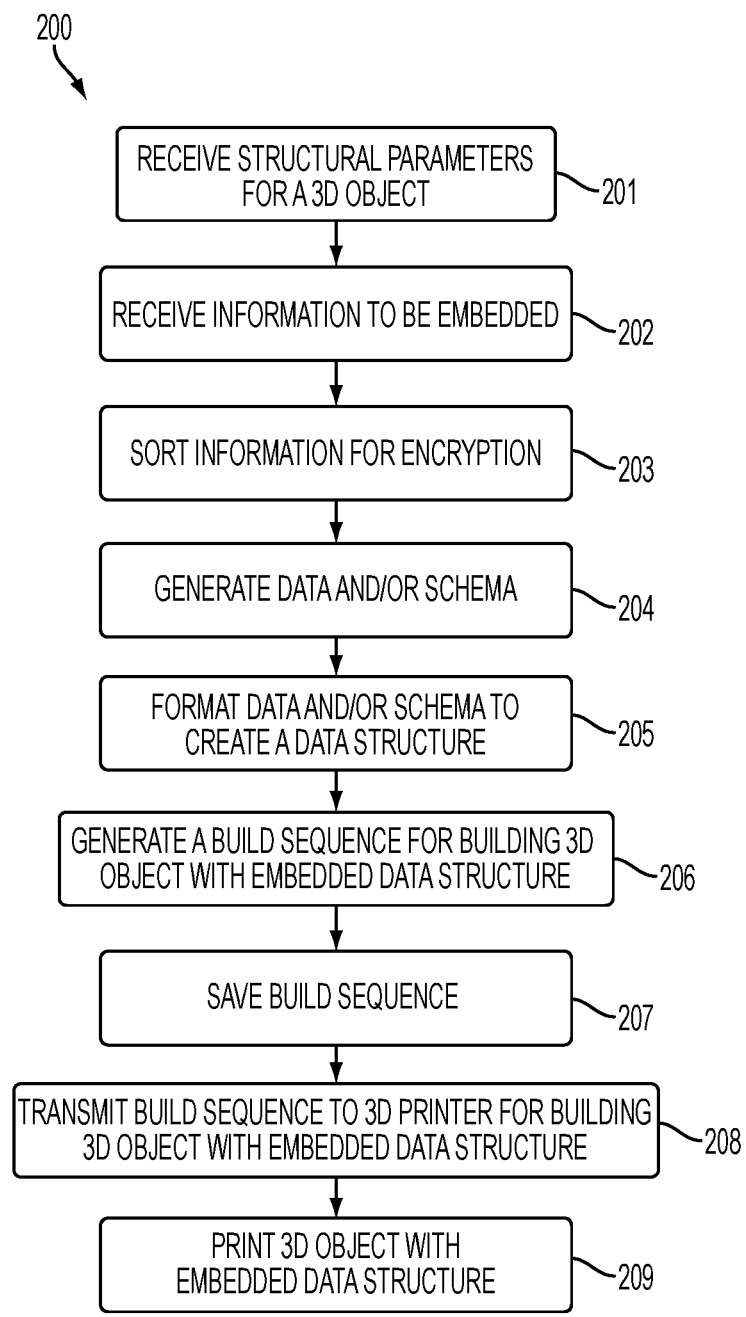
FIG. 2 depicts a flow chart example of a process for embedding information in a three dimensional object.

With reference to the flowchart of FIG. 2, a method for designing and/or building a 3D object which may include information in the form of databases (or data structures, used interchangeably) including data and/or schema, is disclosed. In an embodiment, an add-on enhancement for a known CAD software module may provide instructions to a processor of the computing device to perform the method as described in FIG. 2. Alternatively, the add-on enhancement module may perform at least part of the method as described in FIG. 2.

In step 201, the add-on enhancement module may receive structural parameters for a desired 3D object. Examples of structural parameters may include, without limitation, dimensions, shape, geometry, and build material. In an embodiment, the add-on enhancement module may receive the structural parameters for a 3D object that is to be printed from a 3D print device. The 3D print device may do this by retrieving a design file from a database by querying a database for existing design files. Alternatively, the 3D print device may receive structural parameters from a user, via a user interface, and use the parameters to create the design file.

In another embodiment, the system may receive the design files via a scanner (described in detail below) by scanning a reference 3D object to create one or more visualization files, including structural parameters, representing a model of the reference 3D object. Such visualization files may provide data for rendering a two-dimensional ("2D") and/or 3D visualizations of the reference 3D object on a display device communicatively coupled to, or integrated in, the computing device. Visualization file types may include, by way of example, .asm, STL, IGES, STEP, Catia, SolidWorks, ProE, 3D Studio, and/or Rhino files. In some embodiments, the visualization files may include 2D ("flat") digital images, such as a JPEG, GIF, TIFF, BMP, and/or PDF files. The system may transmit the visualization files to the CAD software for modifying and/or generating 3D CAD files representing the reference 3D object. A 3D print device may then use the file(s) to print any number of replicas of the reference object, as described below. Specifically, CAD files contain specifications, from which geometry is generated, which in turn allow for a representation to be generated. Geometry and representation may be stored in a single CAD file or multiple ones. In certain embodiments, the CAD file(s) for creating the 3D object may be directly rendered using CAD software and based on any suitable tangible or imaginary object. In certain other embodiments, the system may retrieve the CAD file directly from a stored database of CAD files for objects.

The add-on enhancement module may receive information to be embedded in the 3D object in step 202. In an embodiment, a user may provide the information through a user interface. In certain embodiments, the processor may extract the information automatically from databases related to the reference 3D object. In some embodiments, the information itself may be embedded in the reference 3D object. In certain other embodiments, at least a part of the information may be stored at an external location and pointer(s) the external location may be embedded in the reference 3D object. The pointer may be in the form of a hyperlink to a website address, a barcode, a QR code, or other similar forms.

The information may provide instructions and include details relating to the reference 3D object and/or relating to one or more actions that a 3D printer must perform to create a replica of the reference 3D object. Types of information may include, without limitation, information required for printing copies of the reference 3D object; identification information; authentication information; manufacturing license information; intellectual property information; quality control information; composition information; safety information; information relating to post-build operations; information for customer use; information for commercial functions; information for consumer safety; spare parts lists; information for security functions; and combinations thereof. Each item of information may have an ordered structure, such as a [key, value] structure, that enables the data to be searched by an electronic device.

Example of information required for printing copies of the 3D object may include, without limitation structural parameters, design files, CAD files, and/or other such information for manufacturing copies of the object (as discussed above with respect to the reference information). Manufacturing information may also include information needed to license the right to manufacture the object, and/or information needed to purchase the license. For example, the database contained in the object may hold the CAD files, and links to copyright servers, authorization servers, and/or a path to a server that may enable the transfer of funds into the design owner's bank account.

Examples of identification information may include, for the 3D object such as, customer identification, batch and lot numbers, purchase information, job queue orders, and other similar types of identification details. In one embodiment, the information may also provide instructions for handling the produced 3D object after the build operation is complete.

In some embodiments, the information may include authentication information in the form of a set of two or more public keys (e.g., a signature and a serial number), and associated private keys to reduce the chances of counterfeit manufacturing.

Quality control information may include information relating to the year of manufacture, model number, manufacturing plan, and manufacturing options. In some embodiments, the quality control information may further include information such as printer serial number, chemical formula of media, batch number, humidity, temperature, time of manufacture, operator number, calibration number, and common faults and their severity.

The information may also include registration information, address information, and other information that may aid in theft control of 3D objects such as, jewelry, home products, and the like.

Next, in step 203, the add-on enhancement module may apply sorting rules to sort the information received into information that needs to be encrypted and information that need not be encrypted. In an embodiment, the module may receive sorting rules from a user, via a user interface and instruct a processor to sort the information based on the logic provided by the user. In certain other embodiments, the processor may sort the information based on logic that is pre-programmed into the system, or logic that it may retrieve from a data file. Examples of such logic may include (i) a rule set requiring that information relating to manufacturing of the reference 3D object or copies of the reference 3D object, such as design files containing structural design data for manufacturing, be encrypted, and (ii) a rule requiring that public information such as user manual, safety information, and licensing information not be encrypted. The above logic is exemplary, and other sorting logics are within the scope of this disclosure.

The system may use any known techniques for encrypting at least a part of the information before applying it to an object or including it in a data file. Examples may include, without limitation, symmetric key encryption, public key encryption, certificate based encryption, transparent data encryption, or a combination thereof. In an embodiment, the add-on enhancement may allow the user to specify a data encryption scheme.

Pursuant to 204, the add-on enhancement may generate a data representation and/or schema from the received information (encrypted and non-encrypted) by defining a set of rules for encoding information in a format that is human-readable and/or machine-readable. Any known methods and applications (such as XML) may be used to create the data and/or the schema. The data may also include metadata. The generation step may also include defining rules for encryption, as discussed above.

A schema may define how real world entities (information) are modelled into the data, and how the data is organized in a database. In certain embodiments, the schema may also define permissions associated with the database such as level of access granted to a user. The schema of a database may be defined by a user or may be suggested by the CAD software. The schema may include description of the database structure and the position of its copies on the object and/or external to the object. In certain embodiments, the schema may also include semantics (relationships) defining the physical description of the values contained in a database, as defined by the user.

The format or type of data created may vary depending on, without limitation, the space available on the 3D object for embedding the data, the volume of information, the volume of data, size of the database, type of scanner used, or the number of copies of the database (discussed below). Types of data may include, without limitation, integers (16-bit, 32-bit, etc.), Boolean (binary, octate, etc.), alphanumeric strings, textual information, or a combination thereof. In some embodiments, numerals such as 8, ocho, 100-92, square root of sixty four, etc. are symbols that may be used to represent numbers. In certain other embodiments, physical structures may be used as numerals, such as in a CD or a DVD where pits and raised areas on the surface of the disk represent numerical values. Such values can be binary, for example such that the presence of a pit with at least a threshold depth or width represents a zero and the presence of a raised area with at least a threshold height or width represents a one, or vice versa. Or they may be relative, where the pit or raised area of a first depth, width or height range represents a zero; and a second depth, width or height range represents a one. In non-binary systems additional depth or height range may represent additional values. In other embodiments, a mathematical map or a table may be used to represent data, such as a point's location on a 3D object.

In some embodiments, the add-on enhancement may further compress the data. The add-on enhancement, in an embodiment, may allow the user to specify a data compression scheme for the database thereby allowing the database to encode more information in the same amount of physical space. Alternatively, the system may store rules for any now or hereafter known data compression process and it may apply these rules to a data set to compress the data.

In step 205, the data and/or schema generated may be formatted in accordance with the identified schema to create one or more copies of one or more databases, where the database corresponds to a representation of the information that will be embedded in the 3D object during a build operation. A database, in an embodiment, may include a structure (a schema) described by a set of standard values. Physical representations of the database, representing the data and/or the schema, as embedded in the 3D object are discussed below.

In an example embodiment, a database may be a set of key value pairs, expressed as a text string, as in the JSON format as shown below:

{"diagram_number":"3157-381a", "version_number": "3.0.1.1", "name":"coffeeTime!", "license_key": "6a2460061a8c3f82dd07d20c5625a239658149c a004bf921d 6817a84b1e42b", "authorized_date":"01-02-2014", "expiration_date":"01-02,2015", "license_holder": "Joe Businessguy", "info_url":"https://threed_designs.com/2bce5cc29.php"}'

The above database is a simple example and may have the schema built into its structure (the keys). More complicated schemes, and/or encodings that are more efficient, are within the scope of this disclosure. Examples may include a database including tables, database in the form of a graph, a tree, and/or a hierarchy.

Figure 3:
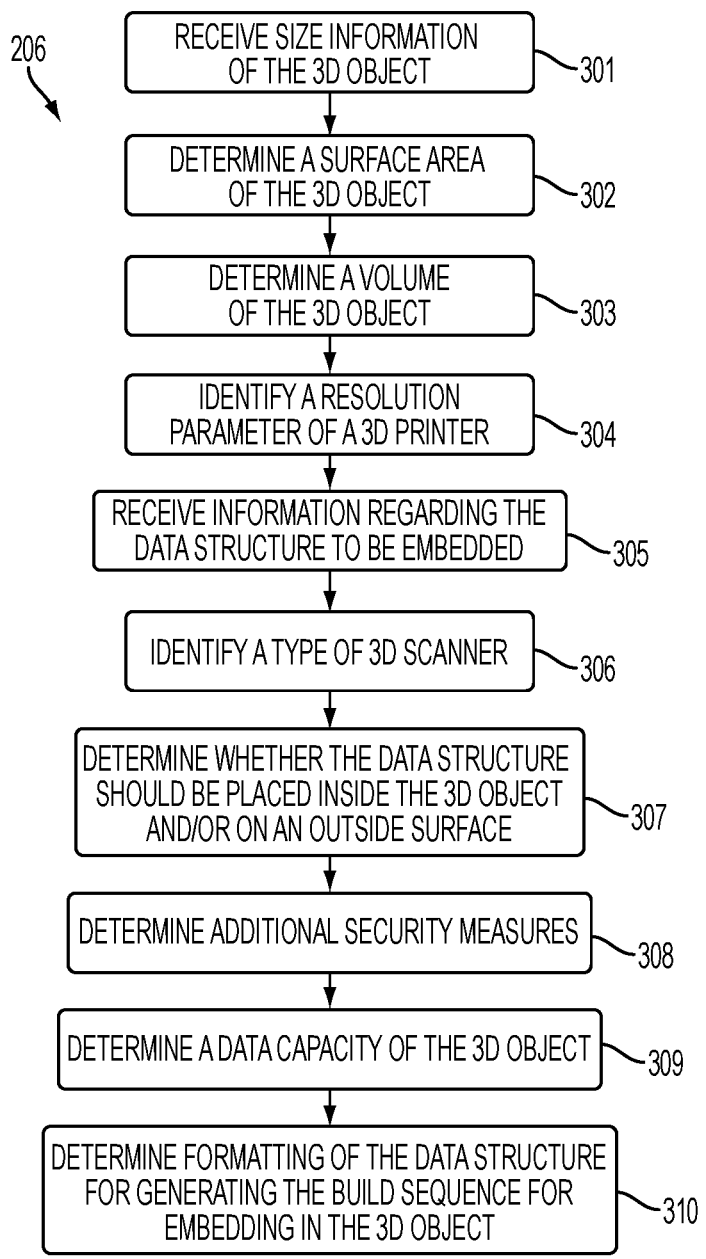
FIG. 3 depicts a flow chart example of a process for generating a build sequence for a three dimensional object, according to an embodiment

After the generation of the one or more databases, the add-on enhancement may generate 206, and save 207 a build sequence for building the 3D object, including an embedded database, using a 3D printer. The build sequence may include rules and parameters that define the location or locations where one or more copies of one or more databases will be embedded inside and/or on the outside of the 3D object. The build sequence may also include size and/or type of the physical representation for embedding one or more copies of one or more databases inside and/or on the outside of the 3D object. In some embodiments, the user may provide the rules and parameters that define the location or locations for embedding one or more copies of one or more databases. Alternatively, the add-on enhancement may suggest the location information for embedding one or more copies of one or more databases based on, without limitation, user-defined criteria, the space available on the 3D object for embedding the database(s), the volume of information, the volume of data, size of the database(s), type of scanner used, or the number of copies of the database(s), as shown in FIG. 3.

For example, the add-on enhancement module may determine a surface area and/or a volume of the 3D object and determine a data capacity of the 3D object using the surface area and/or volume, and the resolution of the 3D printer. In an embodiment, a data capacity may refer to the number of individual pieces of data (bits, alphanumeric characters, etc.) that may be embedded on and/or inside a 3D object. Other information such as geometry and user defined criteria may also be used in the determination of data capacity. Once the module has determined a data capacity, it may apply user-defined rules and/or pre-programmed logic to determine the logic information. Examples of such logic may include: (i) a rule set requiring that structural strength of the 3D object always be above a threshold value; (ii) a rule set requiring that certain types of information be embedded inside the 3D object, and certain other types of information be embedded on the surface of the 3D object; (iii) a rule set requiring that the physical representation of the database(s) may not be visible; (iv) a rule set defining the relationship(s) between a type of physical representation and the location of the database(s); (v) a rule set defining the relationship(s) between a type of scanner to be used for extracting the embedded information and the location of the database(s); and (vi) a rule set requiring embedding the maximum number of copies of one or more databases while maintaining the structural integrity of the 3D object; and a combination thereof.

The physical representations will be not merely two-dimensional printed representations, but rather each will be a three-dimensional structure that represents data, such as a cavity (i.e., a pit in an exterior or interior surface, or an empty space within a structural element), or a raised area such as a raised dome, cylinder, rectangle or other structure. Alternatively, the physical representation may include the addition of 3D matter that is different from the build material, such as metal particles or any suitable fibers. The build sequence may also include the type(s) of physical representations (structural parameters) for embedding one or more copies of one or more databases inside and/or on the outside of the 3D object. Types of physical representation may include physical structures embedded on the surface or inside the 3D object. The size of the physical representations may vary from microscopic to visible. Examples may include, without limitation, sets of raised bits of material on the surface of the object, set of pits on the surface of the object, set of cavities buried inside the object, arrangement of interlocking fibers in an object, tag inserts, embedding detectable metal particles within the object, or a combination thereof. In certain embodiments, the user may provide the type information. In some other embodiments, the add-on enhancement module may determine the type of physical representation based on, without limitation, user-defined criteria, the space available on the 3D object for embedding the database(s), the volume of information, the volume of data, size of the database(s), type of scanner used, or the number of copies of the database(s), as discussed below with respect to FIG. 3.

For example, the system may include a rule set in the build sequence that will cause the 3D printer to embed at least a portion of the database(s) as cavities located on a surface, if the object will be subject to wear and tear during usage. In another example if the system determines that the type of scanner that may be used to scan the 3D object and extract information is an X-ray scanner, the build sequence may include a rule set to embed metal particles in the 3D object by using metal-containing build material when embedding the database. In other embodiments, if the system determines that the build material of the 3D object includes interlocking fibers (or other similar material), then it may cause the build sequence to include a rule set that causes the 3D printer to represent the information as an arrangement of the fibers (e.g., fibers may be arranged as a numeral or set of numerals or other characters).

In another embodiment, the add-on enhancement module may determine the shape and size of the physical representations based on the data type of the database(s). For example, if the system determines that the database includes a binary data type, the build sequence may include a rule set to represent the database using cavities, such that oval pits and/or cavities may represent a 0 and rectangular pits and/or cavities may represent a 1.

With reference to the flowchart of FIG. 3, a method for generating a build sequence is disclosed. For example, for embedding information in a 3D object that is a cylindrical coffee mug, the add-on enhancement may perform one or more of the following logic operations:

1. Receive 301 size information of the coffee mug from the user. For purposes of an example, the dimensions may be 10 cm height, 8 cm diameter to the outside edge, and 0.4 cm thickness of the base and the cylindrical portions with all square edges (not considering the handle).

2. Determine 302 a surface area of at least one surface of the mug on which data will be embedded. For example, a total surface area of the mug of the above dimensions may be determined to be 77.142 cm$^2$=57,714,200,000 microns$^2$ ($10^8 \times \mu m^2 = cm^2$), using the following equation:

$$\begin{aligned}\text{the external surface area} &= \text{Outside surface of the mug's cylinder} \\ &\quad (\pi * 8 \text{ cm} * 10 \text{ cm} = 251.2 \text{ cm}^2) + \text{Inside surface of the mug's} \\ &\quad \text{cylinder } (\pi * (8 \text{ cm} - .4 \text{ cm}) * (10 \text{ cm} - .4 \text{ cm}) = 299.0944 \text{ cm}^2) + \\ &\quad \text{Rim surface } ((\pi * 8 \text{ cm}) - (\pi * (8 \text{ cm} - .4 \text{ cm}) = 1.256 \text{ cm}^2) + \\ &\quad \text{Top (inside) surface of the base } \left(\pi * \left(\frac{7.6}{2}\right)^2 \text{ cm} = 45.352 \text{ cm}^2\right) + \\ &\quad \text{Bottom (outside) surface of the base } \left(\pi * \left(\frac{8}{2}\right)^2 \text{ cm} = 50.24 \text{ cm}^2\right).\end{aligned}$$

3. Determine 303 a volume for at least one internal portion of the mug. For example, a total volume of the mug of the above dimensions may be determined to be 61.845 cm$^3$=61,845,000,000,000 microns$^3$ ($10^{12} \times \mu m^3 = cm^3$), using the following equation: total volume of the cylinder (($\pi*4^2$ cm$^2$*10 cm)-($\pi*3.8^2$ cm$^2$*10 cm)=48.984 cm$^3$)+Volume of the base (($\pi*3.2^2$ cm$^2$*0.4 cm)=12.861 cm$^3$)

4. Identify 304 a resolution parameter of the 3D printer. For example, the resolution parameter of a 3D printer may be 5 microns.

5. Receive 305 information regarding the database(s) to be embedded on the 3D object. Examples of information may include, without limitation size of the database (including compression information), format of data, number of databases and/or number of copies to be embedded. In some embodiments, the module may determine the number of copies of a database to be embedded based on the size of the database, surface area, and volume of the 3D object, preservation of aesthetics of the 3D object, and/or resolution of the 3D printer.

6. Identify 306 the type of scanner that may be used by a user to scan the data. The system, in an embodiment, may identify the type of scanner by prompting the user to enter the information via a user interface. Alternatively, the system may have a default type stored, and it may allow the user to change the default type. In some other embodiments, the system may be communicatively coupled with a scanner and may receive the information directly from the scanner.

7. Determine 307 whether a database needs to be embedded inside and/or on the surface of the object. In some embodiments, some copies of the same database may be embedded on the outside surface of the 3D object, and some copies may be embedded inside the 3D object. In an embodiment, the user may be allowed to specify the internal or surface position of the database, and the determining may be a step of receiving the user's specification. In some other embodiments, the add-on enhancement may determine the internal or surface position based on, for example, the type of information contained in the database (i.e., does the information need to be hidden inside or can it be easily visible), surface are and volume calculations, the type of scanner to be used, and/or the type of physical representation of the database.

8. Determine 308 if additional security methods may be needed for the information, and if so the add-on module may generate the build sequence to include the additional security methods. For example, for enhanced security, the add-on enhancement module may generate a build sequence including a rule set that may define and embed a set of tables (included in a database) in one place, and the contents of each table in a separate location, in and/or on the object such that foreign keys may only be resolved to values if the entire database was available. In object designs that involve multiple discrete components (e.g., a detachable handle for a coffee cup), storing a different table in each piece may enhance security, scanning, and/or both. In another example, the add-on enhancement module may generate a build sequence including a rule set that may define a threshold level of protection. It may then determine the level of protection required for a portion of the database(s), and embed the portions with required protection levels higher than the threshold level inside the 3D object, and/or embed the portions with required protection levels lower than the threshold level on an outside surface the 3D object 9. Determine 309 a data capacity (as defined above) of the 3D object based, at least in part on the determined surface area of the 3D object, the determined volume of the 3D object, and/or the identified resolution parameter. For example, in the current example the mug has a data capacity to hold 2,308,568,000 bits on its surface (based on its surface area and printer resolution). For UTF-16 encoding (which uses 16 bits per character), this translates to 144,285,500 alphanumeric characters. Similarly, the mug has a data capacity to hold 494,760,000,000 bits inside its structure or 30,922,500,000 alphanumeric strings. Hence, the total data capacity of the mug is 31,066,785,500 uncompressed alphanumeric characters.

10. Determine 310 the formatting of the one or more copies of the one or more databases based on at least a part of information received, identified, and/or determined in FIG. 3, for generating the build sequence. The formatting may involve determining the position, size, and/or the type of physical representation of the database(s) for embedding. For example, the add-on enhancement may determine the formatting of the database(s) so as to preserve the structural integrity of the 3D object. Any known methods may be used to determine the formatting information of the database(s). Other types of information, not disclosed here, may be used in determining the formatting of the database(s).

In some embodiments, at least some of the embedded database(s) may be visible to the human eye. In certain other embodiments, at least some of the database(s) may not be visible to the human eye.

In an embodiment, the system may also utilize position information as a mathematical map (database) to embed additional information. For example, values such as a point's location on a 3D object may be represented by physical structures embedded inside and/or on the surface of the 3D object.

In certain embodiments, copies of the same database may be represented as a different physical structure. For example, a single database may be represented as a set of raised elements on the object surface to be read by a laser scanner, and also as a set of cavities inside the object to be read by an ultrasound scanner.

Referring back to FIG. 2, in step 208, the add-on enhancement may transmit the build sequence to any known 3D printer to build the 3D object with the database printed as embedded information, in accordance with the determined formatting and location rules.

In an embodiment, the add-on enhancement may store at least one copy of the database(s) in a computer readable medium external to the 3D object. For example, the add-on enhancement may save to an internal or external memory a copy of the database(s) to a CAD or other file that a 3D printer may access and use to manufacture copies of the 3D object. Thus, a user's electronic device may be able to retrieve the database(s) from the memory. Or, the device may scan the 3D object itself and extract an address that is represented in the embedded data, and then use a browser or other application to access the saved build set or other data at the extracted address. This redundancy may price additional protection for the database information. If the externally saved copy of the database is destroyed, a user may be able to reconstitute the database by scanning it from the physical object. On the other hand, if a 3D object is fractured, a user may be able to retrieve at least a portion of the database by scanning: (1) a copy of the database embedded one or more of the fragments; (2) a copy of the object; and/or (3) an address embedded in the object that can be used to link to an externally stored copy of the database or other information.

Finally in step 209, the 3D printer may print at least one copy of the 3D object with the database printed as embedded information, in accordance with the build sequence including the determined formatting and location rules. This may be any now or hereafter known 3D printing process, such as where the printer builds an object over a substrate using multiple layers of build material. As the printer builds the object from the substrate up, it may leave cavities (pits) or add raised areas on external surfaces or within interior regions of the object, or it may embed metal particles, fibers or other material in certain areas, in order to embed the database into the object.

Figure 4:
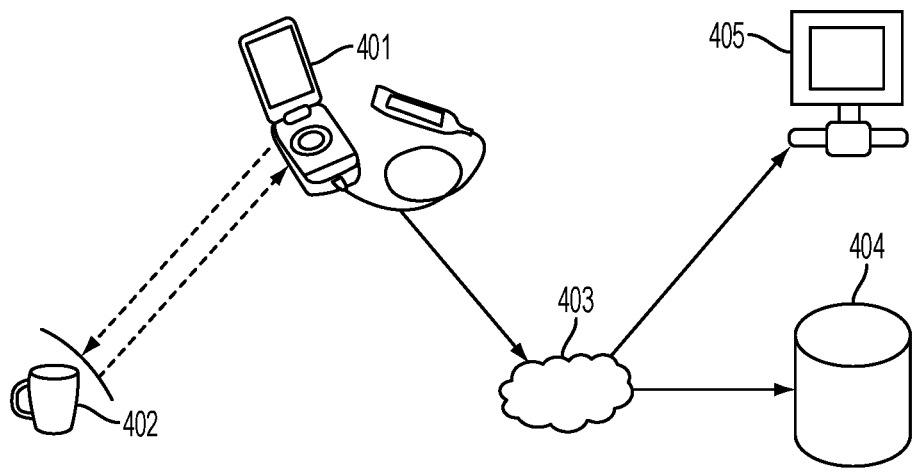
FIG. 4 illustrates a schematic representation of a system scanning a three dimensional object including embedded data structures, according to an embodiment.

In another aspect, FIG. 4 shows a schematic representation of a system 400 including an enhanced 3D scanner 401 for scanning a 3D modeled object(s) 402 including embedded databases (as discussed below). The enhanced 3D scanner may be any known 3D scanner used to model the shape and structure of an object (i.e., identify structural parameters), modified to include the ability to read and/or extract a database built into the object. The scanner may be one or more hardware items and/or software applications in communication with a computing device.

The type of scanner(s) used may vary depending on the type of embedded database, size, position, and/or representation information. Examples of scanners may include, without limitation a laser scanner, an ultrasound scanner, an X-ray scanner, or any other scanner appropriate for reading the database(s) on the surface of or inside a 3D object. Certain other embodiments may include a software application downloaded to a mobile device. The 3D scanner may also include a software application to enable the scanner to read and extract information from an embedded database.

The 3D scanner 401 may also convey the information across a network 403 to external databases 404 and/or applications 405 that can use the data. In an embodiment, the embedded database(s) may include pointers to the appropriate external database or application such that the scanner may automatically identify where to transmit the data.

The 3D scanner may further include, and/or may be connected to, a display device for processing and displaying the extracted data and/or information to a user.

The 3D scanner may further include, and/or may be connected to, a computing device which may allow a user to select and request particular data from an embedded database (instead of the whole database). For example, a user may be allowed to search for particular text strings, request records from one or more tables and/or fields of a displayed database schema, specify filters, build SQL queries, or employ other similar search methods.

Figure 5:
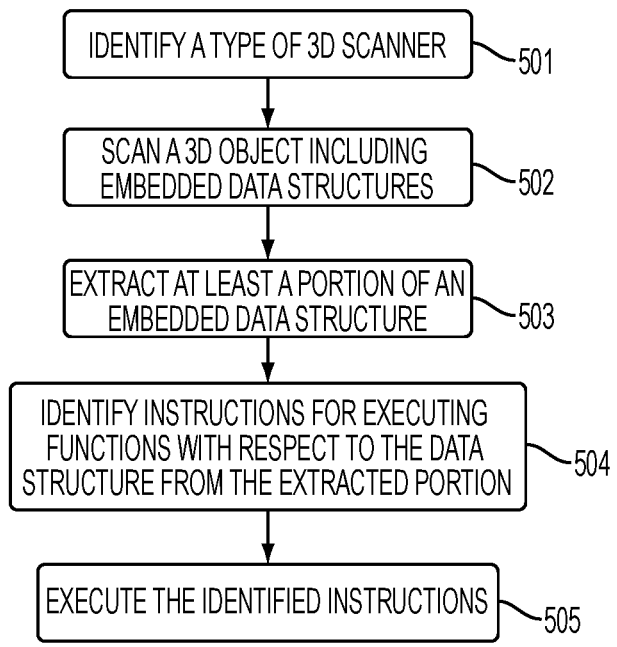
FIG. 5 depicts a flow chart example of a process for scanning a three dimensional object including embedded data structures, according to an embodiment.

With reference to the flowchart of FIG. 5, a method for scanning a 3D modeled object which may include information in the form of embedded database(s), is disclosed. In step 501, the system may identify a 3D scanner capable of reading and/or extracting an embedded database(s) from a 3D object. In an embodiment, the identification may be based on at least the size and the type of physical representations of the database(s).

In step 502, an enhanced 3D scanner capable of scanning embedded database(s) may scan a 3D object. The 3D scanner may then read and/or extract 503 at least a portion of the embedded database(s), or at least a portion of the information from the embedded database(s), from within the 3D objects. The scanner may include a processor that executes software that reads and interprets the data to extract and optionally display any or all of the structured database (or a structured database that exists in a particular format. For example, the scanner may identify the presence of a pit or raised area, measure its size (width, depth or height) and use the size to determine a value that is represented by the size according to a known algorithm or protocol (such as pit of width a=1, pit of width b=0, etc.). Alternatively or in addition, the scanner also may include a communications port and software that, when executed, will cause the scanner to send the information it reads via the communication port to an external application or module (e.g. wirelessly to a cloud application) that can read, interpret, and/or display the data. In an embodiment, the 3D scanner may include software or a module that may impart to the scanner an ability to distinguish between information itself and information contained in a database. The 3D scanner may include programming that it executes so that it is be able to read, interpret, and/or display structured database(s) (in particular formats) embedded in a 3D object. In other embodiments, the 3D scanner may not have such capability, in which case it may transmit the scanned data to an external processor for analysis (such as wirelessly to a cloud application).

In step 504, if the 3D scanner includes the capability to interpret and/or display the scanned data, the system may identify instructions for executing one or more functions with respect to the extracted database. For example, at least a portion of the extracted database portion may include instructions for the system to cause a display device of the scanner, or a display of a communicatively connected computing device, to display at least part of the information to a user based on user-defined filters. In other embodiments, the extracted database portion may include instruction for the system to transmit at least a part of the information to external databases for storage or distribution, and/or external applications for processing based on at least some information extracted from the embedded database(s).

In step 505, the system may execute the identified functions. For example, the scanner (or another application or device to which the scanner has sent the extracted database information) may display the extracted information so that a user may read the information displayed in an understandable format and take some appropriate action. In other embodiments, the scanner might send the extracted information to an external application that takes an automatic action, for example, downloading a file, in response to what the extracted information says. Thus, a processing device in steps 504 and 505 the system may identify, from the extracted data, instructions for causing the system to perform an additional action that uses the data. Such actions may include, for example, causing a display device to display at least a portion of the data, causing a transmitter (i.e., a wireless transmitter or a communications port) to transmit at least a portion of the data to an external database, causing a transmitter to transmit at least a portion of the data to an external application, or causing a user interface of an electronic device to solicit and receive user input for handling the data.

Figure 6:
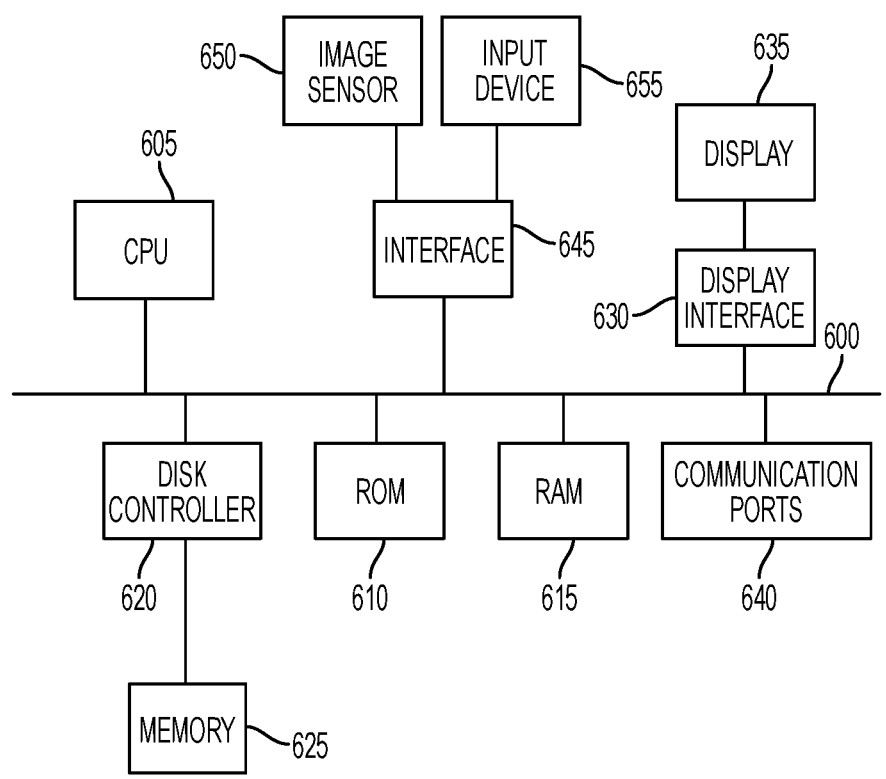
FIG. 6 illustrates a block diagram of example hardware that may be used to contain or implement program instructions according to an embodiment.

FIG. 6 depicts a block diagram of hardware that may be used to contain or implement program instructions. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an example of an electronic device, computing device or processor as such terms are used within this disclosure. Read only memory (ROM) 610 and random access memory (RAM) 615 constitute examples of non-transitory computer-readable storage media.

A controller 620 interfaces with one or more optional non-transitory computer-readable storage media 625 to the system bus 600. These storage media 625 may include, for example, an external or internal DVD drive, a CD ROM drive, a hard drive, flash memory, a USB drive or the like. As indicated previously, these various drives and controllers are optional devices.

Program instructions, software, or interactive modules for providing the interface and performing any querying or analysis associated with one or more data sets may be stored in the ROM 610 and/or the RAM 615. Optionally, the program instructions may be stored on a tangible, non-transitory computer-readable medium such as a compact disk, a digital disk, flash memory, a memory card, a USB drive, an optical disc storage medium and/or other recording medium.

An optional display interface 630 may permit information from the bus 600 to be displayed on the display 635 in audio, visual, graphic or alphanumeric format. Communication with external devices, such as a printing device, may occur using various communication ports 640. A communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Various presently unforeseen or unanticipated alternatives, modifications, variations or improvements therein may be subsequently made by those skilled in the art which are also intended to be encompassed by the following claims.

The invention claimed is:

1. A method of extracting a data embedded in a three dimensional (3D) object, the method comprising, by a processing device:
   identifying a 3D scanning device capable of extracting data embedded as physical representations inside the 3D object based on a type of the physical representations;
   causing the identified 3D scanning device to scan a 3D object and extract data embedded as physical representations inside the 3D object, the physical representations being invisible from outside the 3D object;
   determining at least a location or a size of each of a plurality of physical representations;
   determining a value for each of the plurality of physical representations based on its location, size or both;
   including each value in the extracted data;
   identifying, from the extracted data, instructions for causing the processing device to perform an action that uses the data, wherein the action comprises identifying building instructions for printing a copy of the 3D object;
   performing the action to identify the building instructions; and
   causing a 3D printer to use the building instructions to print the copy of the 3D object.

2. The method of claim 1, further comprising:
   causing a display device to display at least part of the extracted data; and
   receiving a user selection of a portion of the extracted data.

3. The method of claim 1, wherein:
   identifying instructions for performing the action comprise identifying, from the extracted data, instructions for building the 3D object; and
   the method further includes transmitting the building instructions to the 3D printer.

4. The method of claim 1, wherein:
   identifying instructions for performing the action comprises:
     identifying, from the extracted data, a web address, and
     accessing the building instructions at the web address; and
   the method further includes:
     causing the building instructions to be transmitted to the 3D printer.

5. The method of claim 1, wherein:
   the physical representations comprise cavities or raised areas inside the 3D object, and a size of each cavity or raised area represents a value of a data point within a data structure; and
   causing the identified 3D scanning device to scan the 3D object and extracting the data embedded in the 3D object comprises:
     detecting a location and size of each cavity or raised area,
     determining a value for each cavity or raised area based on its location, size or both, and
     including each value in the data.

6. The method of claim 1, wherein:
   the physical representations comprise metal particles; and
   causing the identified 3D scanning device to scan the 3D object and extracting the data embedded in the 3D object comprises:

detecting a configuration of the metal particles,
determining a value based on the detected configuration, and
including each value in the data.

7. The method of claim 1, wherein the identified 3D scanning device comprises the processing device.

8. The method of claim 1, wherein the processing device is part of an external system that is in communication with the 3D scanning device.

9. The method of claim 1, wherein the instructions for causing the processing device to perform the action that uses the data further comprise instructions to do at least one of the following:
cause a display of the electronic device to output at least a portion of the extracted data;
cause a transmitter that is in communication with the processor to transmit at least a portion of the extracted data to an external database;
cause a transmitter that is in communication with the processor to transmit at least a portion of the extracted data to an external application; or
cause the processing device to solicit and receive user input for handling the extracted data.

10. A system for extracting a data embedded in a three dimensional (3D) object, the system comprising:
a computer-readable memory containing programming instructions that are configured to, when executed by a processing device, cause the processing device to:
identify a 3D scanning device capable of extracting data embedded as physical representations inside the 3D object based on a type of the physical representations;
cause the identified 3D scanning device to scan a 3D object and extract data embedded as physical representations inside the 3D object, the physical representations being invisible from outside the 3D object;
determine at least a location or a size of each of a plurality of physical representations;
determine a value for each of the plurality of physical representations based on its location, size or both;
include each value in the extracted data;
identify, from the extracted data, instructions for causing the processing device to perform an action that uses the data, wherein the action comprises identifying building instructions for printing a copy of the 3D object;
perform the action to identify the building instructions; and
cause a 3D printer to use the building instructions to print the copy of the 3D object.

11. The system of claim 10, wherein the instructions for causing the processing device to perform the action that uses the data further comprise instructions to do at least one of the following:
cause a display device to output at least a portion of the extracted data;
cause a transmitter to transmit at least a portion of the extracted data to an external database;
cause a transmitter to transmit at least a portion of the extracted data to an external application; or
cause a user interface to solicit and receive user input for handling the extracted data.

12. The system of claim 10, wherein:
the system also includes the 3D printer;
the programming instructions that are configured to cause the processing device to cause the 3D printer to use the building instructions to build the copy of the 3D object comprise instructions to transmit the building instructions to the 3D printer; and
the 3D printer comprises programming that is configured to, when applied to the building instructions, cause the 3D printer to build the copy of the 3D object.

13. The system of claim 10, wherein:
the system also comprises the 3D printer;
the instructions for performing the action comprise instructions to:
identify, from the extracted data, a web address,
access the building instructions at the web address; and
the system also includes instructions to cause the build instructions to be transmitted to the 3D printer.

14. The system of claim 10, wherein:
the plurality of physical representations comprise cavities or raised areas inside the 3D object, and a size of each cavity or raised area represents a value of a data point within a data structure;
and
the instructions to cause the identified 3D scanning device to scan the 3D object and extract the data embedded in the 3D object comprise instructions to:
analyze data collected by the scanning device to detect a location and size of each cavity or raised area,
determine a value for each cavity or raised area based on its location, size or both, and
include each value in the data.

15. The system of claim 10, wherein:
the plurality of physical representations comprise metal particles;
the identified scanning device comprises an x-ray or magnetic sensor; and
the instructions to cause the identified 3D scanning device to scan the 3D object and extract the data embedded in the 3D object comprise instructions to:
use the scanning device to detect a configuration of the metal particles,
determine a value based on the detected configuration, and
include each determined value in the data.

* * * * *